(12) United States Patent
Berard et al.

(10) Patent No.: US 11,873,903 B2
(45) Date of Patent: Jan. 16, 2024

(54) SELF-CORRECTING HYDRODYNAMIC SEAL

(71) Applicant: Eaton Intelligent Power Limited, Dublin (IE)

(72) Inventors: Gerald Maurice Berard, North Providence, RI (US); Edward Nicholas Ruggeri, Westport, MA (US)

(73) Assignee: Eaton Intelligent Power Limited, Dublin (IE)

( * ) Notice: Subject to any disclaimer, the term of this patent is extended or adjusted under 35 U.S.C. 154(b) by 124 days.

(21) Appl. No.: 17/247,639

(22) Filed: Dec. 18, 2020

(65) Prior Publication Data

US 2021/0190208 A1 Jun. 24, 2021

Related U.S. Application Data

(60) Provisional application No. 62/950,647, filed on Dec. 19, 2019.

(51) Int. Cl.
*F16J 15/34* (2006.01)

(52) U.S. Cl.
CPC .................................. *F16J 15/342* (2013.01)

(58) Field of Classification Search
CPC ..................................................... F16J 15/342
See application file for complete search history.

(56) References Cited

U.S. PATENT DOCUMENTS

| | | | |
|---|---|---|---|
| 4,406,466 A * | 9/1983 | Geary, Jr. | F16J 15/3412 277/400 |
| 5,145,189 A | 9/1992 | Pope | |
| 5,174,584 A * | 12/1992 | Lahrman | F01D 11/003 277/400 |
| 6,145,843 A * | 11/2000 | Hwang | F16J 15/442 277/400 |
| 6,213,473 B1 | 4/2001 | Lebeck | |
| 7,770,895 B2 | 8/2010 | Zheng et al. | |
| 7,914,007 B2 | 3/2011 | Berard et al. | |
| 7,931,277 B2 * | 4/2011 | Garrison | F16J 15/441 277/400 |
| 8,074,995 B2 * | 12/2011 | Vasagar | F16J 15/441 277/416 |
| 8,091,898 B2 | 1/2012 | Garrison | |
| 8,342,534 B2 * | 1/2013 | Vasagar | F16J 15/3244 277/411 |

(Continued)

FOREIGN PATENT DOCUMENTS

JP H0450559 A 2/1992

*Primary Examiner* — Vishal A Patel
(74) *Attorney, Agent, or Firm* — Merchant & Gould P.C.

(57) ABSTRACT

A segment of a seal assembly for forming a hydrodynamic seal against a rotating member can include a main body extending between first and second sides and defining a radial internal surface for forming a hydrodynamic seal with the rotating member. The main body can include a main surface extending between the main body first and second sides, a fluid inlet portion recessed from the main surface, and a hydrodynamic pad region located adjacent the fluid inlet portion and extending in a circumferential direction. The hydrodynamic pad region can include a first section and a second section separated by a land portion, wherein the first and second sections are recessed from the main surface.

15 Claims, 11 Drawing Sheets

(56) References Cited

U.S. PATENT DOCUMENTS

| | | | |
|---|---|---|---|
| 8,356,819 B2 * | 1/2013 | Vasagar | F16J 15/441 |
| | | | 277/411 |
| 8,408,554 B2 * | 4/2013 | Vasagar | F16J 15/40 |
| | | | 277/416 |
| 8,408,556 B2 * | 4/2013 | Vasagar | F16J 15/3244 |
| | | | 277/416 |
| 8,616,554 B2 * | 12/2013 | Vasagar | F16J 15/3244 |
| | | | 277/579 |
| 8,628,092 B2 | 1/2014 | Deo et al. | |
| 9,353,791 B1 | 5/2016 | Peterson | |
| 9,662,753 B1 | 5/2017 | Kloeppel et al. | |
| 9,714,712 B2 | 7/2017 | Kiernan | |
| 9,927,033 B2 * | 3/2018 | Baheti | F16J 15/3488 |
| 9,964,144 B2 | 5/2018 | Kato et al. | |
| 10,054,230 B2 | 8/2018 | Katori et al. | |
| 10,190,429 B2 | 1/2019 | Garrison | |
| 10,274,087 B2 | 4/2019 | Young | |
| 10,303,696 B2 | 5/2019 | Cathcart et al. | |
| 10,337,619 B2 | 7/2019 | Ruggeri | |
| 10,415,573 B2 | 9/2019 | Komatsubara | |
| 10,865,883 B2 * | 12/2020 | Seki | F16J 15/3272 |
| 2005/0094905 A1 | 5/2005 | New | |
| 2008/0042364 A1 | 2/2008 | Zheng et al. | |
| 2008/0284105 A1 * | 11/2008 | Vasagar | F16J 15/3244 |
| | | | 277/306 |
| 2012/0223490 A1 | 9/2012 | Ruggeri et al. | |
| 2014/0062024 A1 | 3/2014 | Bidkar et al. | |
| 2014/0119912 A1 | 5/2014 | Bidkar et al. | |
| 2015/0123350 A1 | 5/2015 | Itadani et al. | |
| 2015/0275684 A1 | 10/2015 | Thatte et al. | |
| 2016/0169389 A1 | 6/2016 | Haynes | |
| 2016/0377181 A1 | 12/2016 | Baheti | |
| 2017/0051621 A1 | 2/2017 | Ackermann et al. | |
| 2018/0372225 A1 | 12/2018 | Ruggeri | |
| 2019/0136908 A1 | 5/2019 | Yeh et al. | |
| 2021/0054937 A1 | 2/2021 | Chuong et al. | |

* cited by examiner

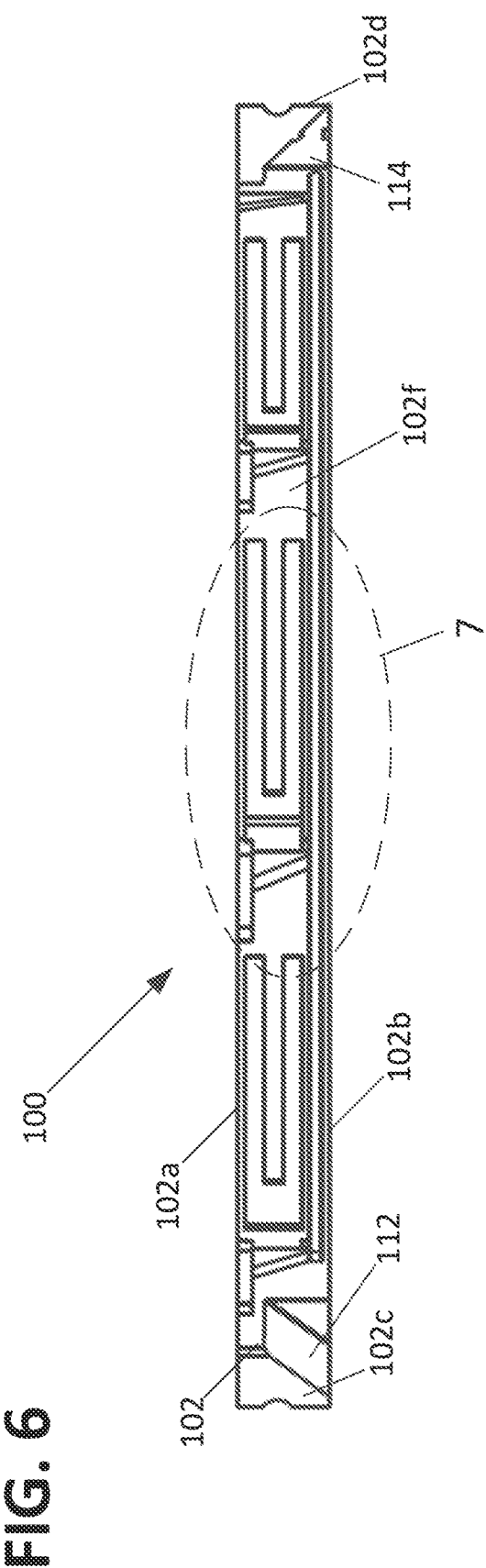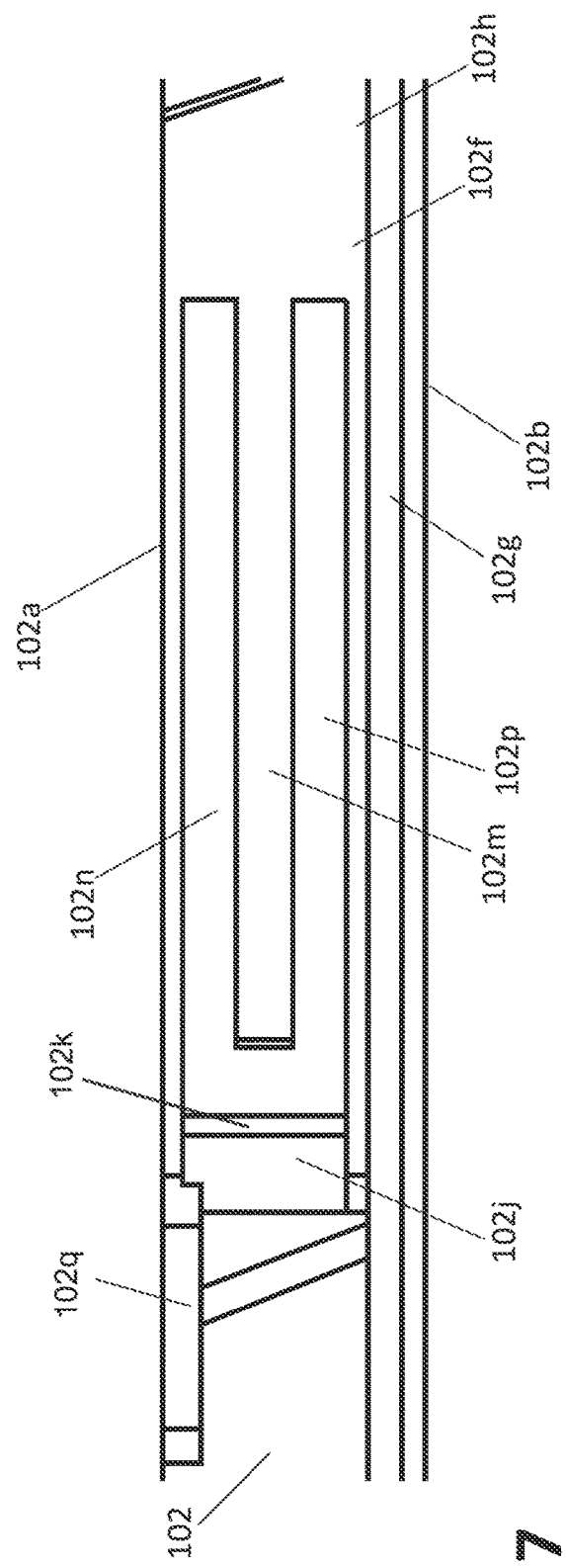

SELF-CORRECTING HYDRODYNAMIC SEAL

RELATED APPLICATION

This application claims priority to U.S. Provisional Patent Application Ser. No. 62/950,647, filed on Dec. 19, 2019, the entirety of which is incorporated by reference herein.

BACKGROUND

Radial segmented seals have been used successfully in aerospace and industrial applications for many years in aircraft engines, gearboxes and compressors. Current segmented seals, hydrodynamic and contacting, are designed to prevent significant leakage and de-pressurization of process fluids in aircraft engines, compressors and gearboxes. When designed properly the seals function adequately. Part of this design cycle is to calculate, measure, or estimate the taper in the engine shaft and match this taper angle with the segmented seal inside diameter thus minimizing leakage. Prediction of this tapering is a complicated effort as it in requires an accurate combined structural and thermal finite element and viscous and friction heating prediction at the interface between the seal inside diameter and the shaft outside diameter. For hydrodynamic radial seals, the accuracy of this calculation is paramount to successful seal performance. If the taper is open to the system pressure side the adequate liftoff may not occur and the hydrodynamic pad would be at or very close to the system pressure and this would operate as a conventional contacting radial seal. This would increase system temperature and limit seal life. Conversely, if the taper were to open to the atmosphere side then system fluid from the system side would be vented to atmosphere and no pressure build up would occur in the hydrodynamic seal pad area. Seal life and engine integrity would be significantly compromised in this situation. Improvements are desired.

SUMMARY

A segment of a seal assembly for forming a hydrodynamic seal against a rotating member can include a main body extending between first and second sides and defining a radial internal surface for forming a hydrodynamic seal with the rotating member. The main body can include a main surface extending between the main body first and second sides, a fluid inlet portion recessed from the main surface, a hydrodynamic pad region located adjacent the fluid inlet portion and extending in a circumferential direction, the hydrodynamic pad region including a first section and a second section separated by a land portion, the first and second sections being recessed from the main surface.

A hydrodynamic seal assembly can include a flange and a plurality of segments in accordance with the above supported by the flange to form a ring.

A machine can include a rotatable shaft and a hydrodynamic seal assembly including a flange and a plurality of segments in accordance with above supported by the flange to form a ring through which the rotating rotatable shaft extends.

In some examples, one or both of the first and second sections have a constant width.

In some examples, the first and second sections have a decreasing depth in a direction away from the fluid inlet portion.

In some examples, the segment is formed from a carbon material.

In some examples, the first and second sections have an equal length to each other.

In some examples, the segment further includes a circumferential groove adjacent the main surface.

In some examples, a combined width of the first and second sections is at least half that of a width of the main surface.

BRIEF DESCRIPTION OF THE DRAWINGS

FIG. 6 is a face side view of the hydrodynamic seal segment shown in FIG. 4, in which the segment is provided with three hydrodynamic seal arrangements.

FIG. 7 is a face side view of a portion of the hydrodynamic seal segment shown in FIG. 4, as indicated at reference 7 on FIG. 6, showing features of one of the hydrodynamic seal arrangements.

Figure 1:
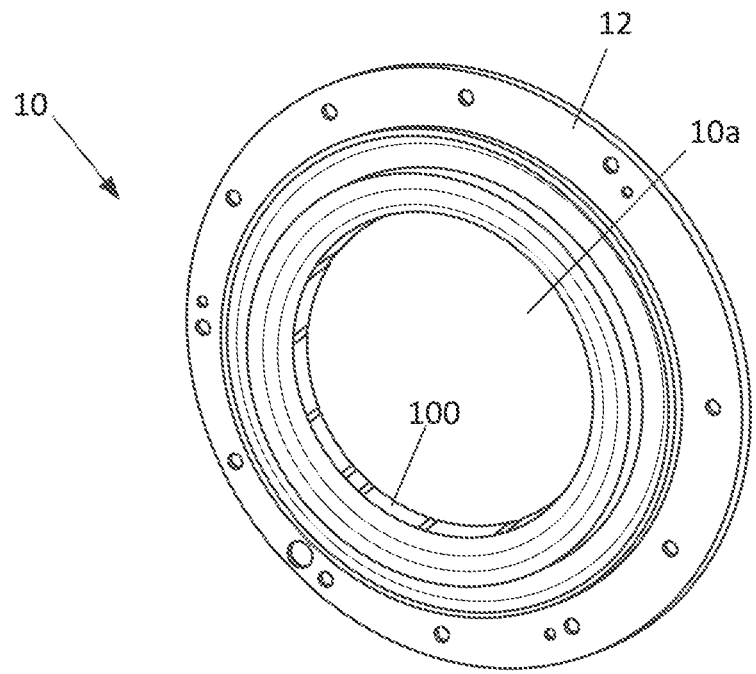
FIG. 1 is a schematic representation of a circumferential segmented seal assembly within which multiples hydrodynamic seal segments are secured.

The accompanying drawings, which are incorporated in and constitute a part of the description, illustrate several aspects of the present disclosure. A brief description of the drawings is as follows:

DETAILED DESCRIPTION

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Figure 2:
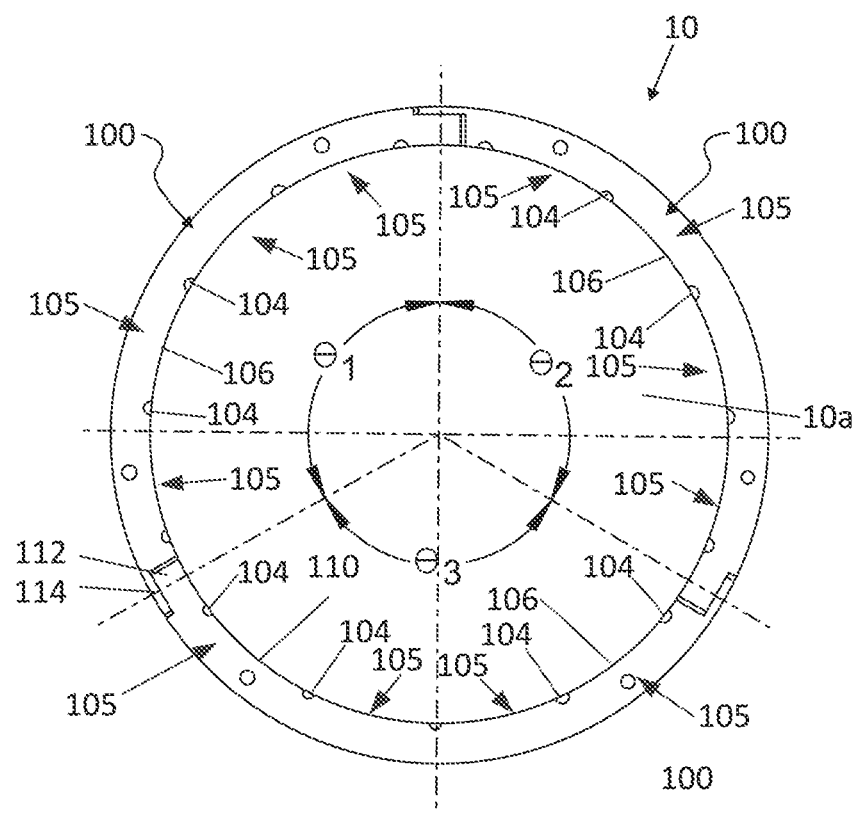
FIG. 2 is a schematic representation of a plurality of seal segments of the assembly shown in FIG. 10.

Referring to FIGS. 1 to 14, a segment 100 of a seal assembly 10 for sealing against a rotating member is disclosed. The segment 100 may be used in a seal assembly of the type shown and described in U.S. Pat. No. 7,770,895, the entirety of which is incorporated by reference herein. The segment 100 may be used in a circumferential segmented seal assembly 10, as shown at FIGS. 1 and 2. In one aspect, the circumferential seal assembly 10 is shown as including a plurality of adjacently arranged segments 100 supported by a flange assembly 12. With continued reference to FIGS. 1 and 2, it can be seen that the seal assembly 10 defines an annulus 10a through which a shaft 14 (e.g. see FIG. 3) can extend such that the segments 100 are oriented about the shaft 14 to provide a seal.

In one aspect, the segment 100 includes an arc-shaped main body 102 extending between first and second sides 102a, 102b and extending between a first and second ends 102c, 102d. In one example, the main body 102 is formed from a material including carbon. The first and second ends 102c, 102d are oriented at an angle to each other such that multiple segments can be combined to form a ring. Accordingly, the angular range defined between the first and second ends 102c, 102d will typically be a multiple of 360°, such as 72°, 90°, 120°, or 180°. In the example shown at FIGS. 1 and 2, three segments 100 are provided that each form a 120° ($\theta_1$, $\theta_2$, $\theta_3$=120°) segment of a seal ring. Additionally, the segments 100 may include cooperating features 112, 114 intended to overlap or interconnect with an adjacent segment, as is depicted at FIGS. 2 to 6. The main body 102 is further shown as defining a radial or circumferential outer surface 102e and a radial or circumferential inner surface 102f. The radial internal surface 102f may be characterized as having, in part, a main surface 102h. The radial internal surface 102f corresponds to a bore side of the segment 100 and provides a sealing surface against a rotating member, such as a shaft or runner.

Figure 3:
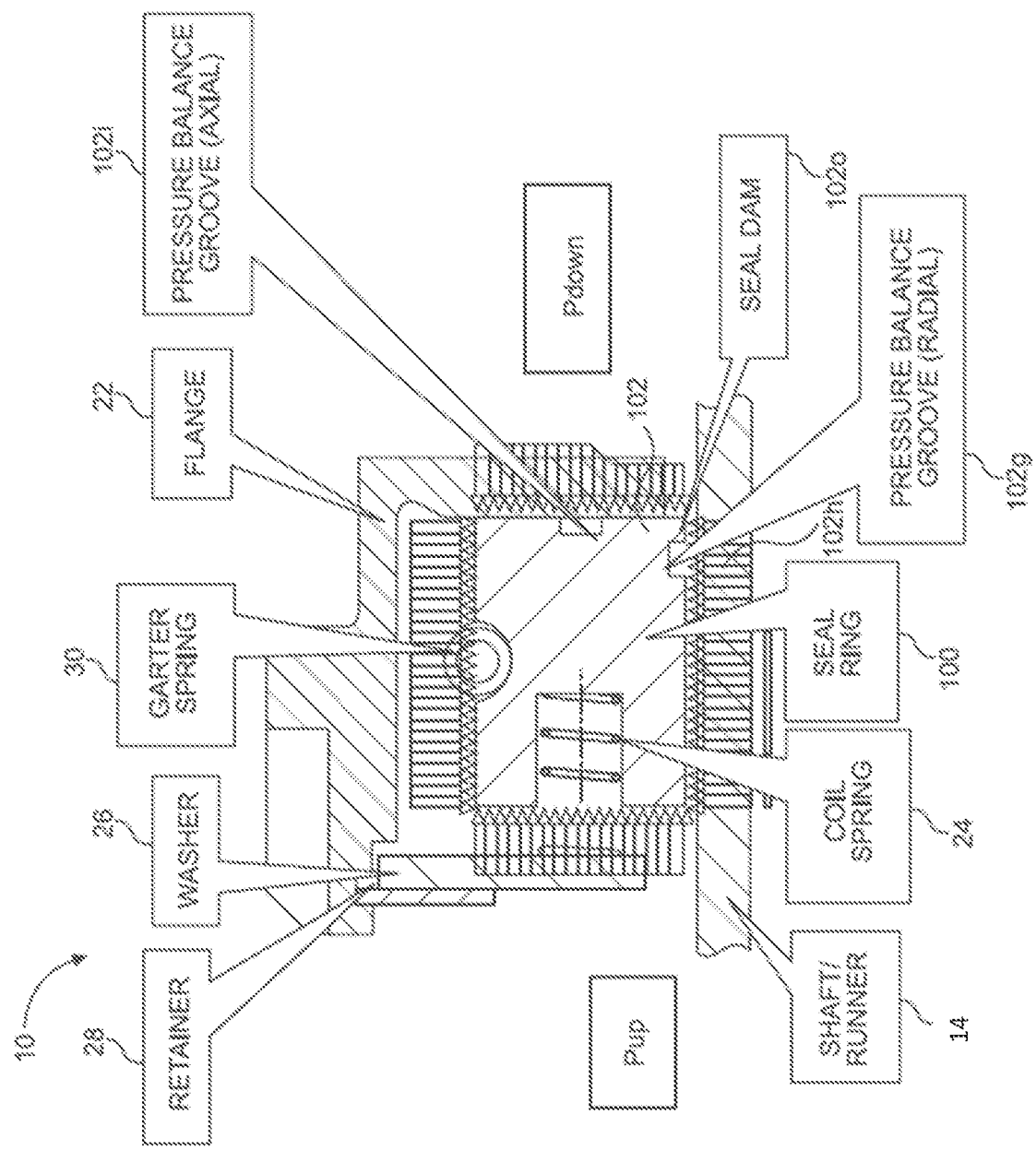
FIG. 3 is a schematic cross sectional view of the seal assembly shown in FIG. 1 in an installed application with a rotating shaft.

Referring to FIG. 3, a schematic cross-sectional view of the seal assembly 10 is presented, wherein the seal assembly 10 is shown as being mounted onto a shaft or runner 14 such that the seal segments 100 are arranged about the shaft or runner 14. As depicted, each seal segment 100 is shown as having a main body 102 being provided with a circumferential pressure balance groove 102g, a seal dam 102o, and an axial pressure balance groove 102i. The seal segments 100 include additional features which are shown and described later. The seal assembly 10 is also shown as including a flange 22 housing the seal segments 100. A coil spring 24, washer 26, and retainer 28 are provided to urge the seal segments 100 in an axial direction while a circumferential garter spring 30 is provided about the outer surface of the seal segments 100 to hold the seal segments 100 together.

Figure 4:
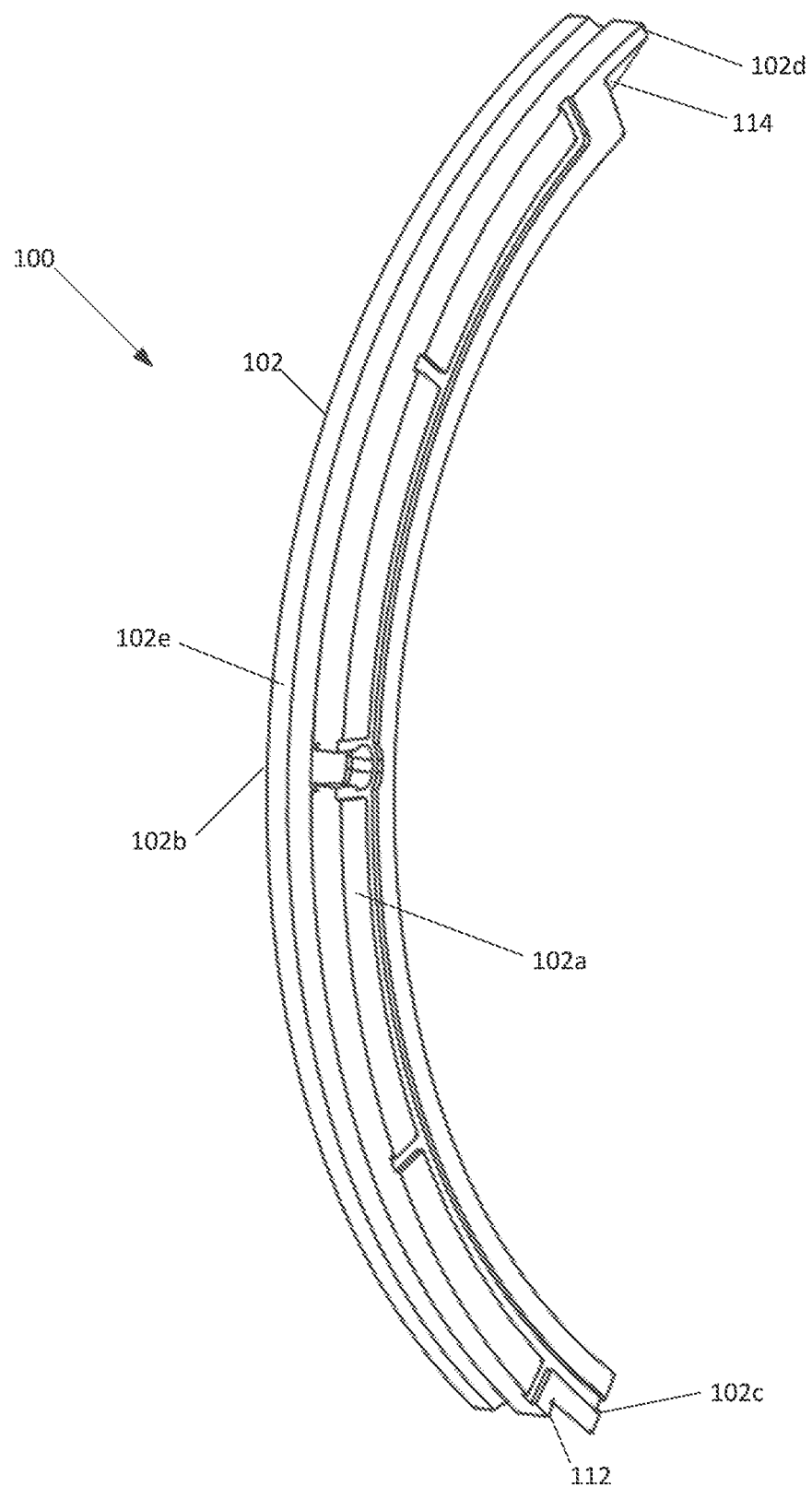
FIG. 4 is a perspective view of a hydrodynamic seal segment of the seal assembly shown in FIG. 1.
Figure 5:
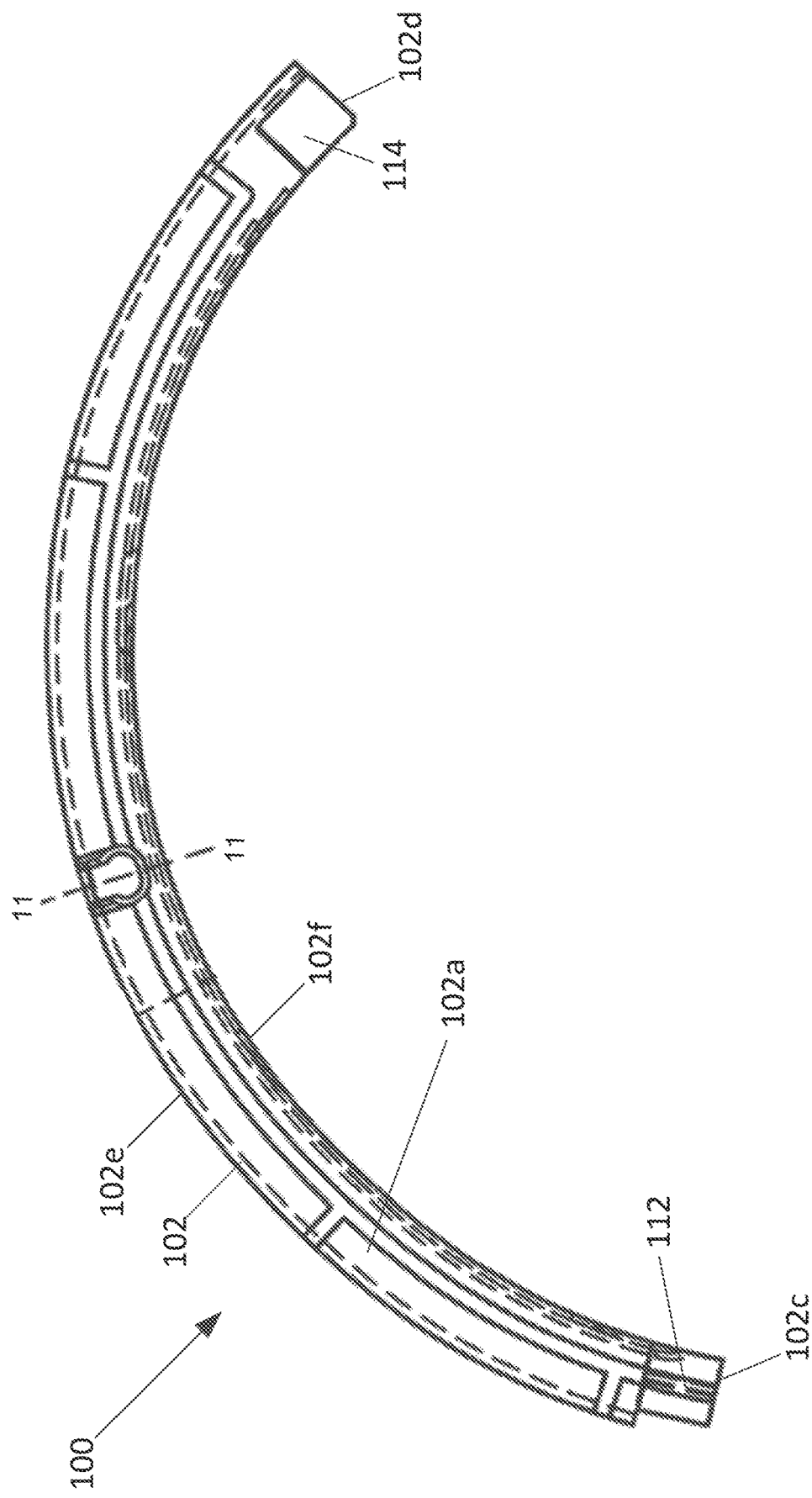
FIG. 5 is a first side view of the hydrodynamic seal segment shown in FIG. 4.
Figure 8:
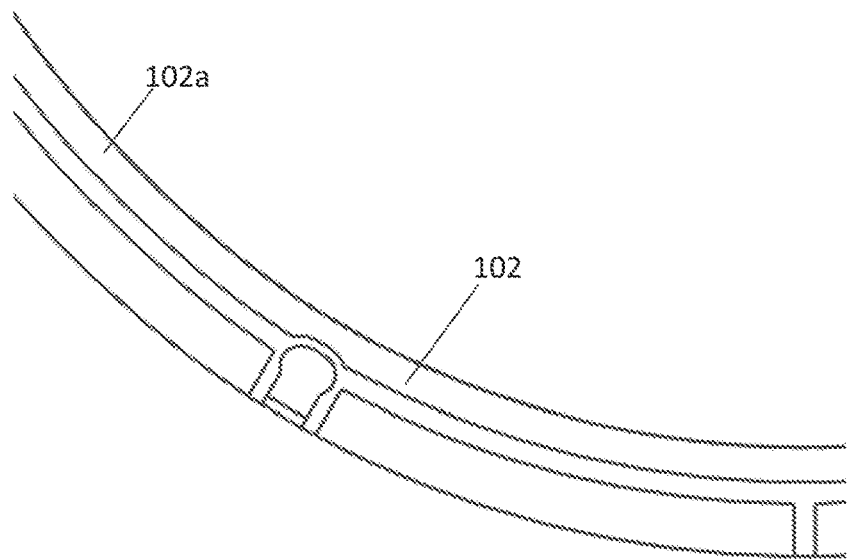
FIG. 8 is a first side view of the hydrodynamic seal segment portion shown at FIG. 4.
Figure 9:
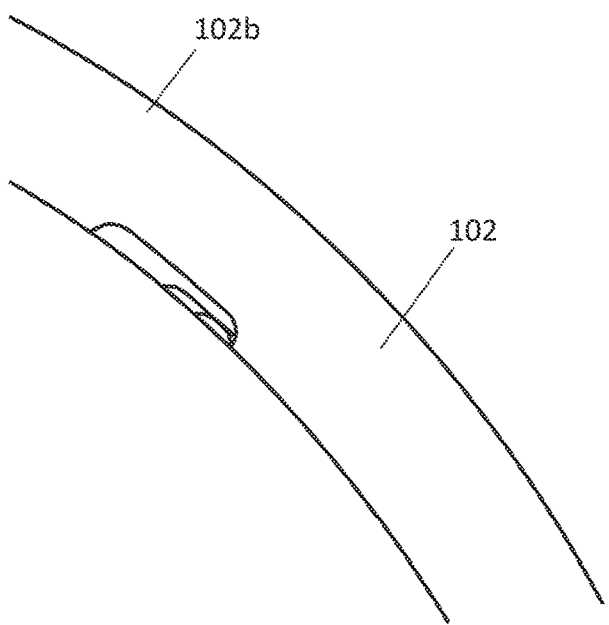
FIG. 9 is a second side view of the hydrodynamic seal segment portion shown at FIG. 4.

In one aspect, the radial inner surface 102f of each segment 100 is defined by one or more hydrodynamic arrangements 105 for facilitating sealing by controlling hydrodynamic fluid flow. For example, and schematically as shown at FIGS. 1 and 2, each of the segments 100 is provided with four such hydrodynamic arrangements 105, for a total of twelve hydrodynamic arrangements 105. A segment 100 can be provided with a single hydrodynamic arrangement 105 or any number of desired arrangements 105. For example, the particular example segment 100 shown at FIGS. 4 to 6 is provided with three hydrodynamic arrangements.

Figure 10:
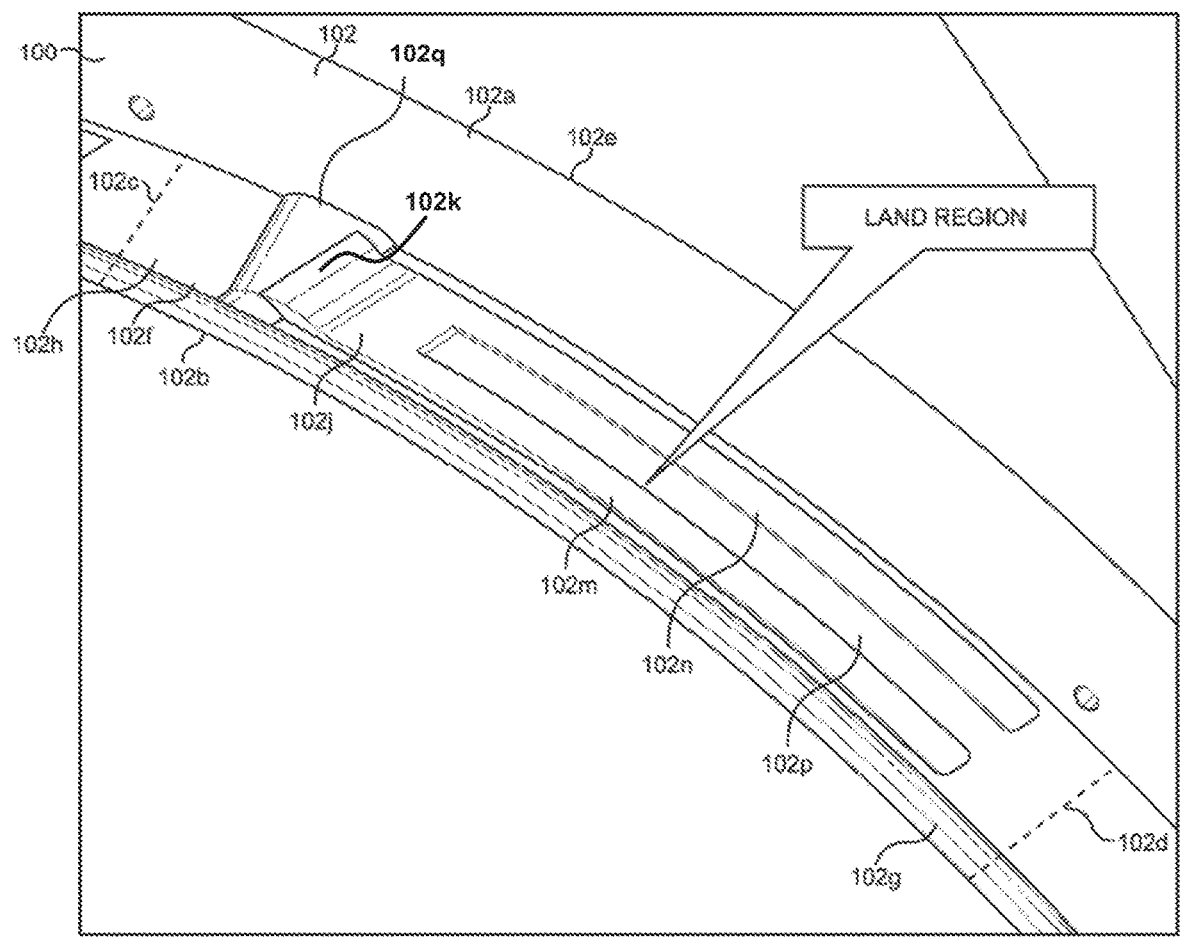
FIG. 10 is a face-side perspective view of the hydrodynamic seal segment portion shown at FIG. 6.
Figure 11:
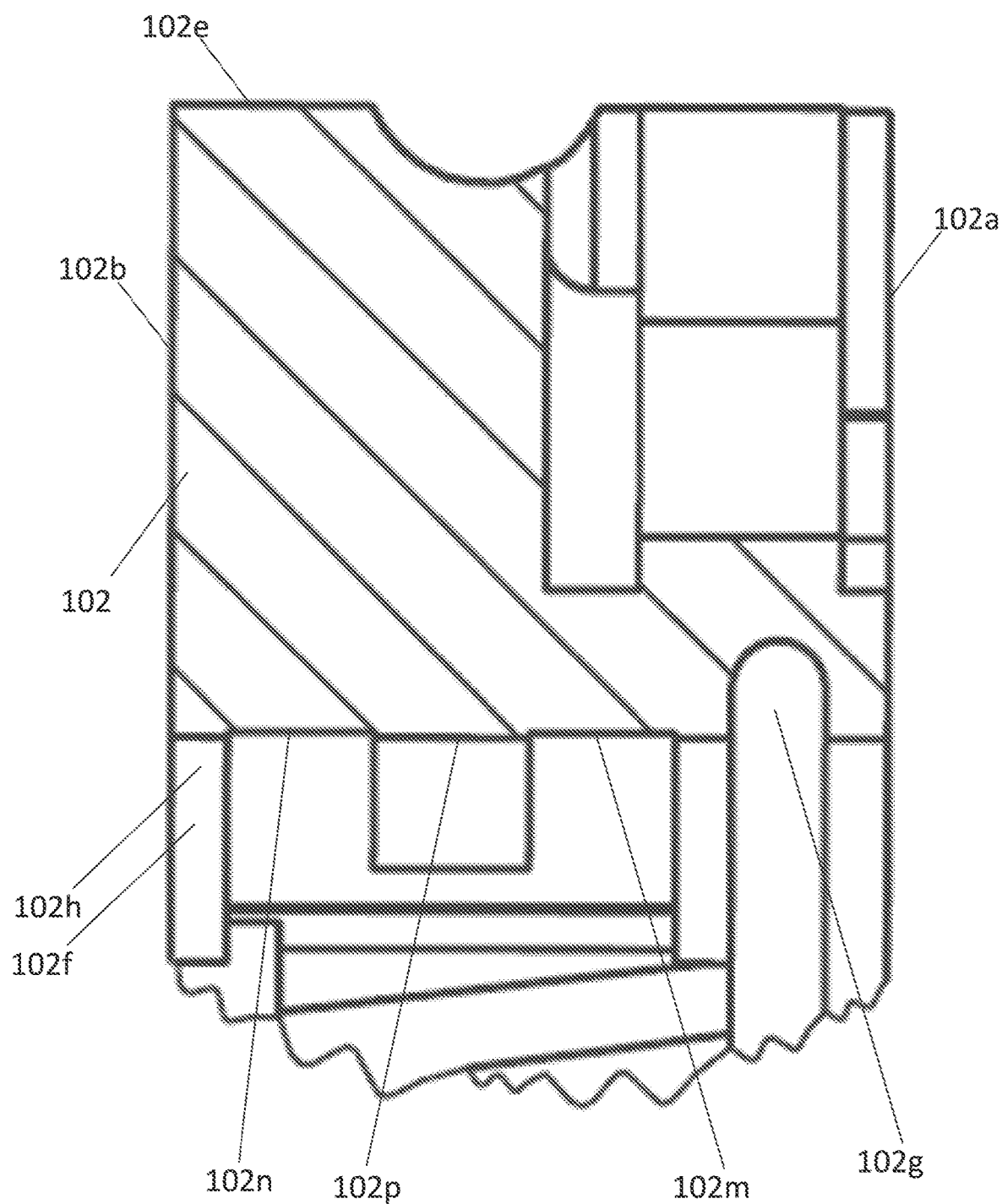
FIG. 11 is a cross-sectional view of the hydrodynamic seal segment portion shown at FIG. 4, taken along the line 11-11 at FIG. 5.

In one aspect, and as most easily seen at FIGS. 7 and 10, the hydrodynamic arrangement 105 can include an inlet portion 102q extending transversely across the radial internal surface 102f between the first side 102a and the pressure balance groove 102g. The inlet portion 102q allows for fluid to be fed into the radial internal surface 102f of the seal segment, thereby ensuring that the hydrodynamic seal has a continuous supply of system fluid. In the example shown, the inlet portion 102q is recessed below the main surface 102h and tapers from the side 102a towards the pressure balance groove 102g. Other configurations are possible. For example, the inlet portion 102q could have a constant width or could be provided by multiple radial drilled holes.

In one aspect, the hydrodynamic arrangement 105 has a hydrodynamic pad region 102j adjacent the inlet portion 102q. The hydrodynamic pad region 102j is recessed below the main surface 102h and is shown as including a lead-in portion 102k and circumferentially extending first and second sections 102m, 102n separated by a land portion 102p. In the example shown, the land portion 102p is the part of the main surface 102h. This configuration may be referred to as a forked configuration with the first and second sections 102m, 102n defining tines of the hydrodynamic pad region 102j. In general terms, the lead-in portion 102k has a depth that tapers in a direction towards the first and second sections 102m, 102n while the first and second sections 102m, 102n have a depth that also continues to taper in the direction towards the second end 102d such that the first and second sections 102m, 102n become shallower in a direction towards the second end 102d. In the example shown, the sections 102m, 102n have an equal length and width. However, the land portion 102p may be configured such that the sections 102m, 102n have a different length from each other and/or have a different width from each other. The sections 102m, 102n are also shown as having a constant width. However, one or both of the sections 102m, 102n may have a varying width, for example, a width that tapers towards the second end 102d. Furthermore, the disclosed sections 102m, 102n are shown as being symmetrically arranged on the main surface 102h such that they are equidistant from a centerline of the main surface 102h, where the main surface 102h is defined as the surface extending from the side 102a to the circumferential groove 102g. However, the sections 102m, 102n may be asymmetrically arranged such that one of the sections 102m, 102n is located either closer or farther away from the centerline of the main surface 102h as compared to the other section 102m, 102n. The land 102p may be accordingly located and shaped with a varying width to accommodate such an arrangement. In general, the width of the sections 102m, 102n can be approximately 0.02 inches or wider. The width of the land portion 102p may be selected such that the desired width of the sections 102m, 102n is achieved. In the example shown, the combined width of the first and second sections 102m, 102n is at least half of the width of the main surface. In one example, the combined width of the first and second sections 102m, 102n is greater than half of the main surface width.

In operation, as fluid (e.g. air) enters transversely at the inlet 102q and is then directed circumferentially and compressed at the lead-in portion 102k. From the lead-in portion, the fluid is split by the land portion 102p and enters the first and second sections 102m, 102n where the fluid is further compressed travelling along the length of the sections 102m, 102n. In circumstances where the shaft 14 and the main surface 102h are perfectly parallel, as can be seen schematically at FIG. 4, the resulting upward pressure P1 increasingly generated by the fluid traversing the length of the section 102m will generally be equal to the pressure P2 generated by the fluid traversing the length of the section 102n. Accordingly, the pressure created by the compressing fluid at the sections 102m, 102n is generally balanced and does not create a moment force that would otherwise cause the seal segment 100 to rock either towards the first or second sides 102a, 102b about a longitudinal axis X of the seal segment 100.

Figure 13:
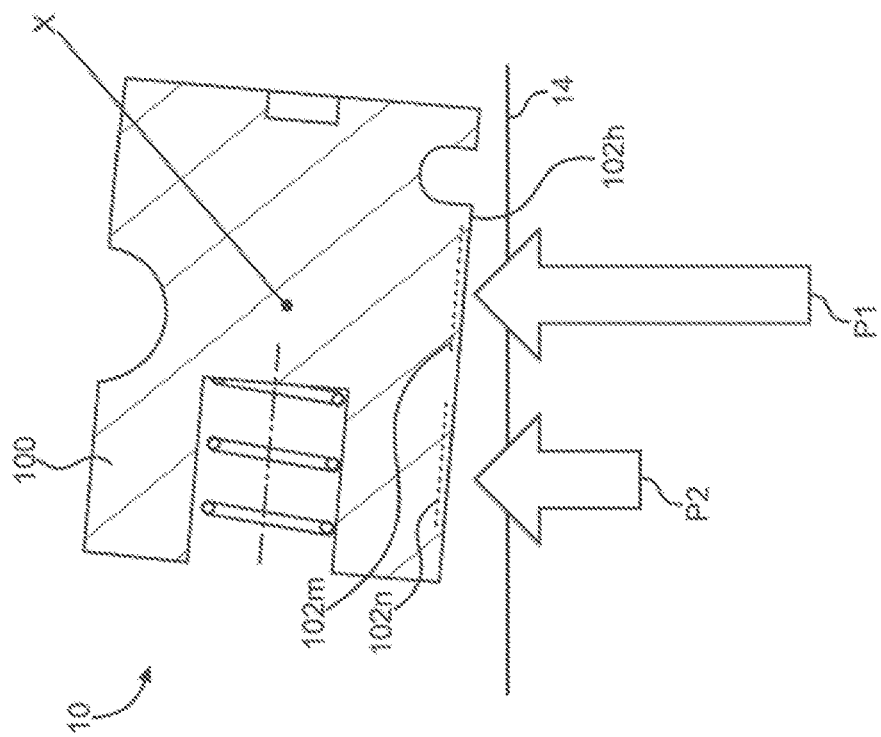
FIG. 13 is a schematic cross-sectional view of the hydrodynamic seal segment shown at FIG. 4 illustrating a face-side perspective view of the hydrodynamic seal segment portion shown at FIG. 6, wherein self-correcting forces of the hydrodynamic seal arrangements act to return the seal segment to a balanced state.
Figure 12:
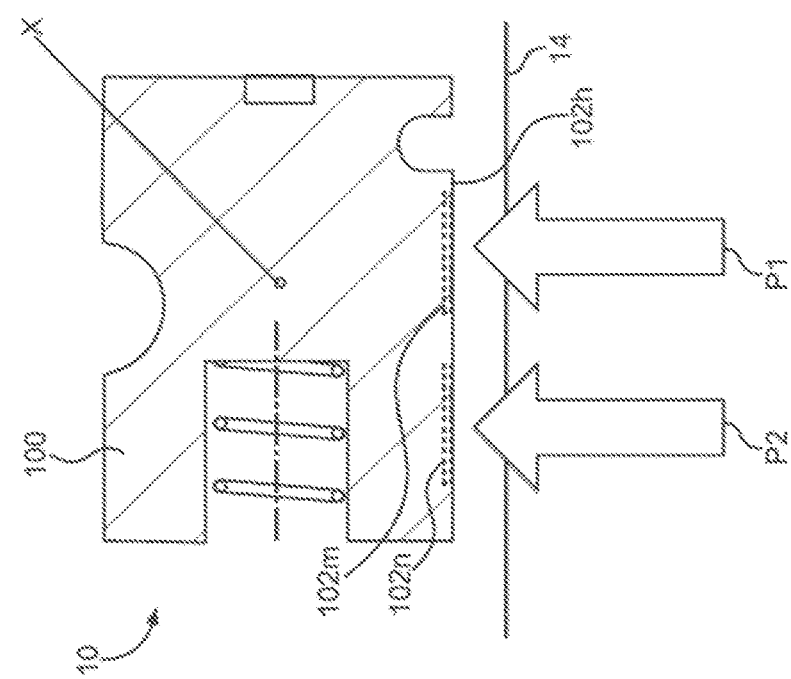
FIG. 12 is a schematic cross-sectional view of the hydrodynamic seal segment shown at FIG. 4 illustrating a face-side perspective view of the hydrodynamic seal segment portion shown at FIG. 6, wherein the hydrodynamic seal arrangements maintain the seal segment in a balanced state.

With reference to FIG. 13, when the shaft 14 develops a minor shaft taper or wobble, the surface 102h is no longer naturally parallel to the outer surface of the shaft 14. Minor tapering would be in the order of ±0.001 inch or less. Such a condition results in an uneven pressure between P1 and P2 at each of the sections 102m, 102n, as can be seen at FIG. 13, and in contrast to FIG. 12 where a taper has not yet developed. Accordingly, the pressure associated with the section 102m, 102n that is nearest the side with the narrower clearance between the shaft 14 and the surface 102 will be greater than the pressure on the other section 102m, 102n and will thus generate a correcting or righting force to rotate the seal segment 100 to rotate towards the other side either about the longitudinal axis X or another axis, such as an axis parallel to the axis X. In general terms, the side with the narrower clearance between the shaft 14 and the surface 102 can be referred to as the closed side and the other side can be referred to as the open side. Regardless of the taper direction, the segment 102m, 102n on the open side of the taper would develop less film stiffness and thus less hydrodynamic forces than the segment 102m, 102n on the closed side. The closed side would develop a more stiff hydrodynamic film and thus a higher lift-off force. This situation would result in a correcting moment, i.e. the seal would attempt to reach equilibrium. Therefore, regardless of which side the taper exists, if the seal is being fed fluid, then a correcting hydrodynamic force would result. When the inner diameter surface 102h of the seal segment 100 is parallel to the shaft surface, as illustrated at FIG. 12, it will provide a more stable hydrodynamic film as opposed to tapered shaft which could destabilize the hydrodynamic film.

As compared a seal segment provided with a conventional hydrodynamic pad region with only single large segment having no intervening land portion, the disclosed closed side segment 102m, 102n is more greatly protected from fluid exhausting out the open side of the closed side segment 102m, 102n. In a conventional, single pad configuration, the clearance between the shaft and the edge of the pad at the open side defines the extent to which undesirably exhaustion will occur. With the disclosed design, the open side segment 102m, 102n will generally have the same clearance at this location and thus the open side segment 102m, 102n will be subject to the same exhaustion dynamic. However, the closed side segment 102m, 102n is protected by the land portion 102p which has a clearance to the shaft that is significantly less than the aforementioned clearance, and in the example shown, is less than half of this clearance. Accordingly, the closed side segment (segment 102m in FIG. 13) is able to continue to compress the fluid and keep the seal operational. Thus, not only does the disclosed design create a desirable correcting force, the disclosed design also maintains a higher level of functionality in comparison to conventional designs under shaft tapering or wobbling conditions.

Figure 14:
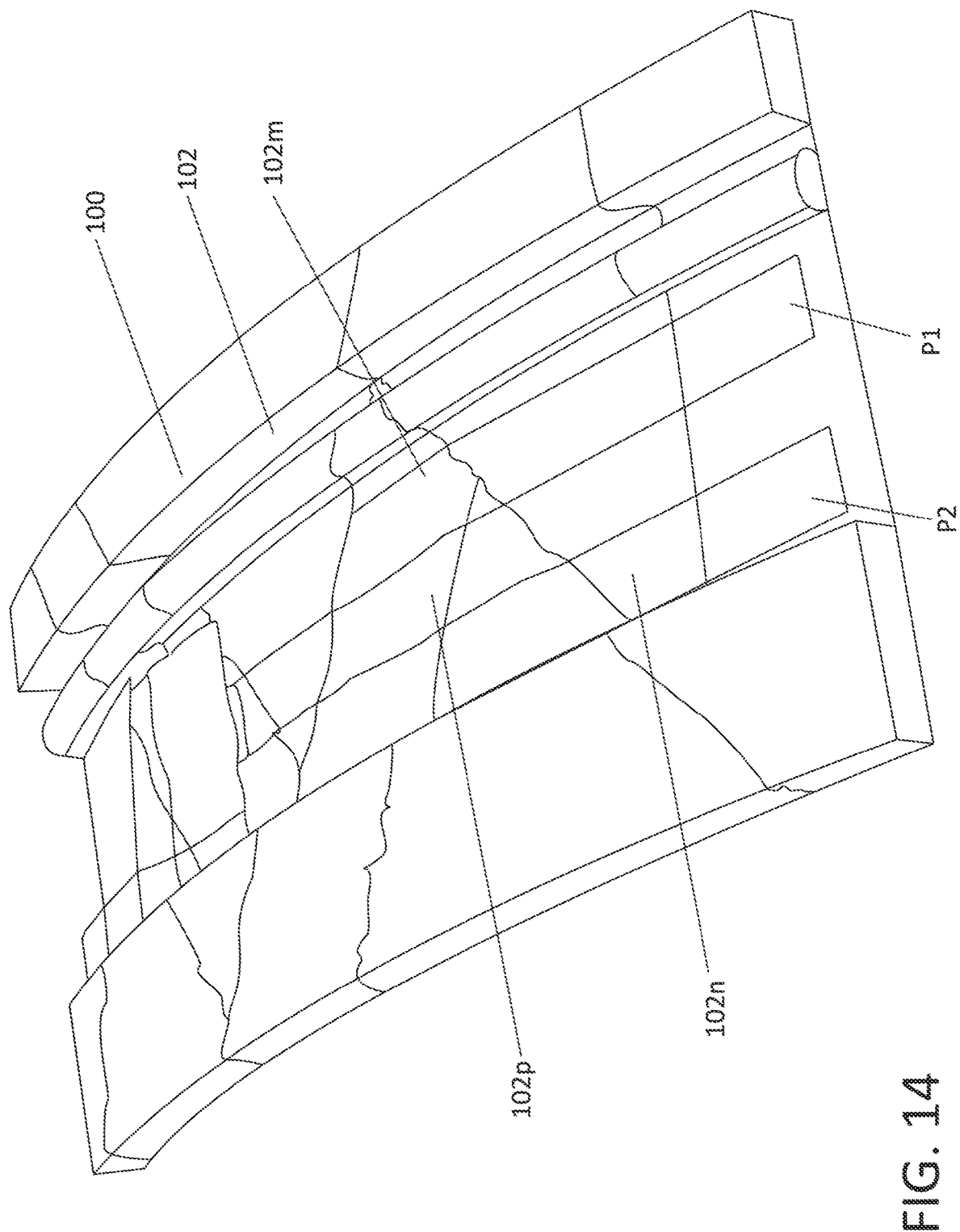
FIG. 14 is a computational fluid dynamic analysis of the radial segmented seal with a hydrodynamic seal arrangement of the type disclosed herein, illustrating the localized self-correcting forces generated by the disclosed design.
Figure 15:
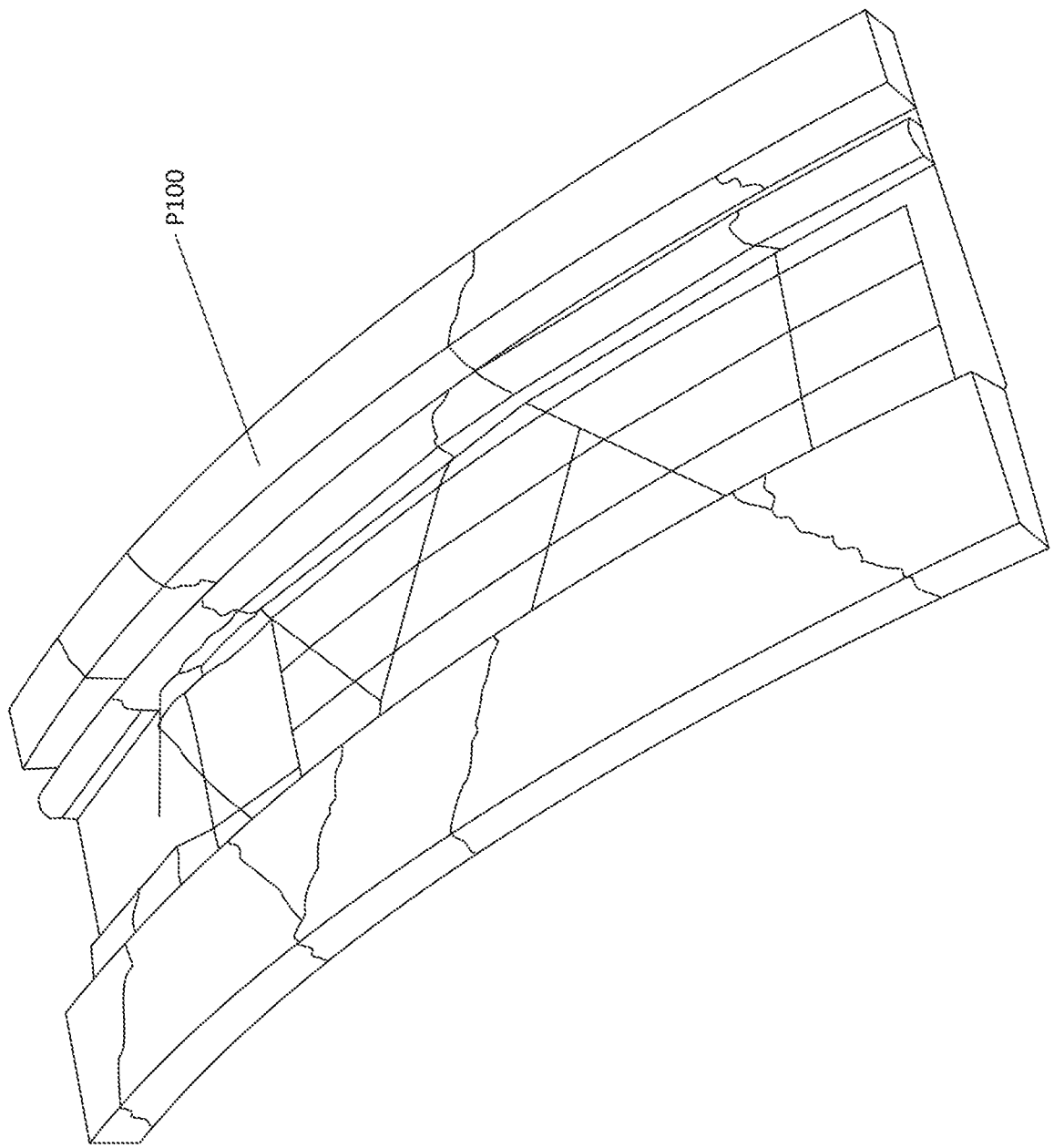
FIG. 15 is a computational fluid dynamic analysis of a prior art radial segmented seal without localized self-correcting forces.

Referring to FIG. 14, the correcting force is further illustrated, where the creation of a high pressure region P1 at the segment 102m can be readily viewed in a pressure profile generated from computer fluid dynamics model. In contrast to the disclosed design, and referring to FIG. 15, it can be seen that a seal segment P100 provided with a conventional hydrodynamic pad region with a only single large segment with no intervening land portion is unable to generate the same correcting force as the disclosed design as the compressing fluid is able to exhaust out of the open side.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. A hydrodynamic seal assembly comprising:
 a) a plurality of segments arranged to form an annulus, wherein at least one of the segments has a main body having a radial inner side, extending between first and second sides, for forming a hydrodynamic seal with a rotating member, the radial inner side defining a main surface extending from the main body first side and a circumferential groove adjacent to and recessed from the main surface and being located proximate to and extending parallel with the main body second side, the main body further defining a plurality of spaced apart hydrodynamic pads, each comprising:
  i) a fluid inlet recessed from the main surface and extending transversely from the main body first side to the circumferential groove;
  ii) a single lead-in element recessed from the main surface and extending circumferentially from the fluid inlet, the lead-in element having a depth that tapers circumferentially in a direction away from the fluid inlet; and
  iii) a first section and a second section recessed from the main surface and extending circumferentially from the single lead-in element and being connected thereto the first and second sections being parallel to each other and separated by a circumferentially extending land forming a portion of the main surface, wherein the first and second sections have a decreasing depth tapering in a direction away from the lead-in element and terminating at the main surface.

2. The hydrodynamic seal assembly of claim 1, wherein one or both of the first and second sections have a constant width.

3. The hydrodynamic seal assembly of claim 1, wherein the plurality of segments are formed from a carbon material.

4. The hydrodynamic seal assembly of claim 1, wherein the first and second sections have an equal length to each other.

5. The hydrodynamic seal assembly of claim 1, wherein a combined width of the first and second sections is at least half that of a width of the main surface.

6. A hydrodynamic seal assembly comprising:
 a) a flange;
 b) a plurality of segments supported by the flange to form an annulus, each of the plurality of segments including a main body having a radial inner side extending between first and second sides and forming a hydrodynamic seal with a rotating member, the radial inner side defining a main surface extending from the main body first side and a circumferential groove adjacent to and recessed from the main surface and being located proximate to and extending parallel with the main body second side, the main body further defining a plurality of spaced apart hydrodynamic pads, each comprising:
i) a fluid inlet recessed from the main surface and extending transversely from the main body first side to the circumferential groove;
ii) a single lead-in element recessed from the main surface and extending circumferentially from the fluid inlet, the lead-in element having a depth that tapers circumferentially in a direction away from the fluid inlet; and
iii) a first section and a second section recessed from the main surface and extending circumferentially from the single lead-in element and being connected thereto the first and second sections being parallel to each other and separated by a circumferentially extending land forming a portion of the main surface, wherein the first and second sections have a decreasing depth tapering in a direction away from the lead-in element and terminating at the main surface.

7. The hydrodynamic seal assembly of claim 6, wherein one or both of the first and second sections have a constant width.

8. The hydrodynamic seal assembly of claim 6, wherein the plurality of segments are formed from a carbon material.

9. The hydrodynamic seal assembly of claim 6, wherein the first and second sections have an equal length to each other.

10. The hydrodynamic seal assembly of claim 6, wherein a combined width of the first and second sections is at least half that of a width of the main surface.

11. A machine comprising:
a) a rotatable shaft; and
the hydrodynamic seal assembly of claim 8, wherein the rotatable shaft extends through the annulus.

12. The machine of claim 11, wherein one or both of the first and second sections have a constant width.

13. The machine of claim 11, wherein the plurality of segments are formed from a carbon material.

14. The machine of claim 11, wherein the first and second sections have an equal length to each other.

15. The machine of claim 11, wherein a combined width of the first and second sections is at least half that of a width of the main surface.

* * * * *